(12) United States Patent
Kirovski et al.

(10) Patent No.: US 9,836,774 B2
(45) Date of Patent: Dec. 5, 2017

(54) COMPARATIVE SHOPPING TOOL

(71) Applicant: Microsoft Technology Licensing, LLC, Redmond, WA (US)

(72) Inventors: Darko Kirovski, Kirkland, WA (US); Deepak Vijaywargiay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/046,862

(22) Filed: Oct. 4, 2013

(65) Prior Publication Data
US 2014/0040073 A1 Feb. 6, 2014

Related U.S. Application Data

(62) Division of application No. 11/537,013, filed on Sep. 29, 2006, now Pat. No. 8,554,638.

(51) Int. Cl.
*G06Q 30/00* (2012.01)
*G06Q 30/06* (2012.01)

(52) U.S. Cl.
CPC ..... *G06Q 30/0623* (2013.01); *G06Q 30/0603* (2013.01); *G06Q 30/0629* (2013.01); *G06Q 30/0641* (2013.01)

(58) Field of Classification Search
CPC ..................................... G06Q 30/00
USPC ....................................... 705/26.1
See application file for complete search history.

(56) References Cited

U.S. PATENT DOCUMENTS

| | | | |
|---|---|---|---|
| 6,085,186 A | 7/2000 | Christianson et al. | |
| 6,725,222 B1 | 4/2004 | Musgrove et al. | |
| 6,873,968 B2 | 3/2005 | Ehrlich et al. | |
| 7,610,233 B1 * | 10/2009 | Leong | G06Q 10/087 705/26.3 |
| 7,693,750 B2 | 4/2010 | Christensen | |
| 7,793,750 B2 | 9/2010 | Ushiroda et al. | |
| 7,831,685 B2 | 11/2010 | Dai et al. | |
| 8,255,391 B2 | 8/2012 | Kulkarni | |

(Continued)

OTHER PUBLICATIONS

Ichoose.com1, https://web.archive.org/web/20001210062800/http://ichoose.com/product/getstarted2.jsp, dated Dec. 10, 2000.*

(Continued)

*Primary Examiner* — Mark Fadok
(74) *Attorney, Agent, or Firm* — Harness, Dickey & Pierce, P.L.C.

(57) ABSTRACT

The claimed subject matter relates to a computer-implemented architecture that can provide a non-invasive comparative shopping tool, such as a browser plug-in. For example, the plug-in can determine whether a web user is currently visiting a purchase page, thus indicating that the web user is likely to be interested in purchasing items online. Upon making this determination, the plug-in can display a non-invasive listing (that can be quickly and conveniently dismissed) of comparable items at favorable prices (or with favorable features, etc.) that are available for purchase at other web sites. In addition, the plug-in can communicate with a data store, e.g., by way of the web, in order to help make various determination as well as to receive the listing of comparable items.

18 Claims, 11 Drawing Sheets

(56) References Cited

U.S. PATENT DOCUMENTS

| | | | |
|---|---|---|---|
| 2001/0007098 A1* | 7/2001 | Hinrichs | G06Q 30/02 705/14.23 |
| 2002/0019763 A1* | 2/2002 | Linden | G06Q 30/02 705/14.53 |
| 2002/0052928 A1 | 5/2002 | Stern et al. | |
| 2002/0111873 A1* | 8/2002 | Ehrlich | G06Q 20/201 705/80 |
| 2002/0143660 A1 | 10/2002 | Himmel et al. | |
| 2002/0161670 A1* | 10/2002 | Walker | G06Q 30/02 705/26.1 |
| 2002/0178014 A1 | 11/2002 | Alexander | |
| 2003/0065584 A1 | 4/2003 | Takaoka | |
| 2003/0074267 A1 | 4/2003 | Acharya et al. | |
| 2003/0088477 A1* | 5/2003 | Kobayashi | G06Q 30/02 705/26.41 |
| 2003/0105589 A1 | 6/2003 | Liu et al. | |
| 2003/0105681 A1* | 6/2003 | Oddo | 705/27 |
| 2003/0115111 A1 | 6/2003 | Fisher | |
| 2003/0154129 A1 | 8/2003 | Goff | |
| 2003/0236710 A1 | 12/2003 | Tong et al. | |
| 2004/0019536 A1 | 1/2004 | Ashkenazi et al. | |
| 2004/0039639 A1 | 2/2004 | Walker et al. | |
| 2004/0199441 A1 | 10/2004 | Mayfield | |
| 2005/0010494 A1 | 1/2005 | Mourad et al. | |
| 2005/0033771 A1* | 2/2005 | Schmitter et al. | 707/104.1 |
| 2006/0064339 A1* | 3/2006 | Allred | G06Q 30/0201 705/7.29 |
| 2006/0138219 A1 | 6/2006 | Brzezniak et al. | |
| 2006/0155656 A1 | 7/2006 | Kreder, III et al. | |
| 2006/0206563 A1* | 9/2006 | Van De Sluis | 709/203 |
| 2006/0241965 A1 | 10/2006 | Walker et al. | |
| 2006/0253578 A1* | 11/2006 | Dixon | G06Q 10/06 709/225 |
| 2007/0011270 A1 | 1/2007 | Klein et al. | |
| 2007/0038616 A1 | 2/2007 | Guha | |
| 2007/0073599 A1* | 3/2007 | Perry | G06Q 30/02 705/26.5 |
| 2007/0136457 A1 | 6/2007 | Dai et al. | |
| 2007/0239560 A1* | 10/2007 | McGuire et al. | 705/26 |
| 2008/0091546 A1 | 4/2008 | Kirovski et al. | |
| 2011/0162052 A1* | 6/2011 | Hayward | G06F 21/41 726/5 |

OTHER PUBLICATIONS

Ichoose.com2, https://web.archive.org/web/20001018171103/http://ichoose.com/ dated Oct. 18, 20000.*

Reich, Robert, "Towards a New consumer protection", University of Pennsylvania Law Review, vol. 128:1, pp. 1-40.*

Admin, Future of comaprison Shopping Sites, Geek.com, Jul. 9, 2001.*

Clark et al., "Stay or Leave: Applying Approach-Avoidance Theory to Virtual Enviornments", Journal of Marketing & Customer Strategy Managment, Dec. 2009, 8 pages.

Doorenbos, et al., "A Scalable Comparison-Shopping Agent for the World-Wide Web", Feb. 1997, Proc first intl conf on Autonomous Agents, , 10 pages.

Lynch, Jr., "Wine Online: Search Costs Affect Competition on Price, Quality, and Distribution", Winter 2000, Marketing Science, Informs, vol. 19, No. 1, 21 pages.

M2 Presswire, "NetIQ ships appnrianger: 4.0: Expands e-businessmonitoring support, adds powerful new reporting module provides incremental path to Microsoft operations manger", ProQuest, Mar. 2001, 4 pages.

Office action for U.S. Appl. No. 11/537,013, mailed on Oct. 17, 2012, Kirovski et al., "Comparative Shopping Tool", 13 pages.

Office action for U.S. Appl. No. 11/537,013, mailed on Feb. 14, 2013, Kirovski et al., "Comparative Shopping Tool", 15 pages.

Sun, et al., CWS: A Comparative Web Search System. May 2006, Proc 15th intl conf on WWW, 10 pages.

* cited by examiner

COMPARATIVE SHOPPING TOOL

CROSS REFERENCE TO RELATED PATENT APPLICATIONS

This application is a divisional of, and claims priority to, U.S. patent application Ser. No. 11/537,013, filed Sep. 29, 2006, which is incorporated herein by reference in its entirety.

BACKGROUND OF THE INVENTION

With the meteoric growth of the Internet in recent years, there has been an associated rise in many if not all current aspects relating to the Internet, as well as development of many new uses for this ubiquitous communication tool. One such area that has witnessed substantial growth over the years is the field of online shopping. Businesses as well individuals are constantly creating new ways to buy and sell products and/or services over the Internet as well as new ways to implement those ideas.

However, in the field of online comparative shopping no conventional system or tool has yet provided an online shopper with adequate functionality, convenience, ease, or trust. Accordingly, one of the most popular means of comparative shopping online is to enter an item (e.g., product or service) into a search engine then manually wade through the results. One difficulty with employing a search engine is that a vast majority of the results are often not related to making a purchase. For example, if a user intends to buy new eyeglasses, she might enter the keyword eyeglasses into a search engine only to find that a majority of the results relate to studies regarding different brands, instructions for determining whether one needs glasses, history of and/or evolution of eyeglasses, manufacture of eyeglasses, different designs, and the like.

Accordingly, it is likely from the outset that many of the results returned by a search engine will be irrelevant to an online shopper. Some search engines today, however, automatically provide advertisements and/or recommendations that are especially directed to online shopping, so the first few results may be expressly intended to be suitable to online shoppers. In addition, a user might supplement the keyword by adding the term(s) "buy", "purchase" or the like with the keyword eyeglasses to be more certain that the results returned will be relevant. Yet, even assuming the most optimal case that all results are for online shopping, the shopper has no way available to locate the bargains or the best deals short of clicking on each of the results in succession, which can be literally hundreds if not thousands.

Moreover, even with this approach, the shopper is often forced to navigate through a series of links just to get to a purchase page (e.g., a page that provides a purchase indicator such as "add to cart", etc.) Thus, many extra clicks, time and effort is essentially wasted. Moreover, the shopper will often be forced to repeat the above steps for each different website she visits, usually involving frequent switching between web browser instances further increasing the delays and/or frustration. Further, no matter how competitive a price may appear on any of the given websites visited thus far, the shopper has no way of guessing whether she might find an even better deal on the next link of resulting websites.

While some recommendation sites currently exist, many of these are (as with search engines) ad-based. Thus, the recommendations supplied by these sites (or the first several links provided as search results) are not ultimately designed to benefit the shopper, but rather designed to benefit the vendor who paid for the advertisement/recommendation and the ad publisher who received advertising revenue to display the ad/recommendation. In extreme cases ad-based recommendations can actually be detrimental to the consumer because they may obfuscate the true bargains. Moreover, a user must be aware of these recommendation sites in the first place in order to use them, and often they are designed for only a single product or line of products. In addition, most ad-based recommendation systems are constantly irritating the shopper even during those times she is not interested in shopping.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The claimed subject matter disclosed and claimed herein, in one aspect thereof, comprises an architecture that can facilitate comparative shopping. In accordance therewith, the architecture can include a comparison component that is, e.g., a plug-in for a web browser. When the web browser is instructed to display a purchase page (e.g., a page that provides a purchase indicated such as a "buy now" button, an "add to cart" button or the like), the comparison component can automatically detect such is the case.

Making this detection/determination can be advantageous because it can be a viable indicator that the user of the web browser is interested in purchasing an item (e.g., a product or service). In accordance therewith, if the user is interested in purchasing an item, then the user is much more likely to be receptive to additional information involving the item, such as comparable items at better prices available, e.g., at other web locations (e.g., other purchase pages). Accordingly, the comparison component can identify page data relating to the purchase page such as the name (e.g., identifier, description) of the item and its price as well as the URL relating to the purchase page. This page data can be sent to a comparative shopping server for analysis.

The comparison shopping server can be data store for page data for all purchase pages (e.g., the purchase page and all other purchase pages). Accordingly, the comparison shopping server can return to the comparison component a list of comparative items, each of which is equivalent or substantially similar to the item on the purchase page. The list can include the comparative items at comparative prices, each of which can be anchor text for a hyperlink to the corresponding other purchase page that offers the item at the indicated price. Generally, the list will include N "best" comparative items, where N is a positive integer and "best" is based upon various criteria, usually the lowest price, most features, etc.

In accordance with one aspect, the comparison component can display the list to the shopper in a non-invasive manner. For example, the list can be displayed only after the user has indicated a desire to see it (e.g., by clicking on a notification that a list of comparative items vis-à-vis the instant item is available. According to one aspect the list can be displayed as an overlay, in a newly generated frame, in a tab, etc. In addition, for example, during times when the user is not interested in purchasing a product, the user can dismiss the list with a quick maneuver or gesture from an input device, thus mitigating potential annoyance and/or frustration.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

DESCRIPTION OF THE INVENTION

Figure 1:
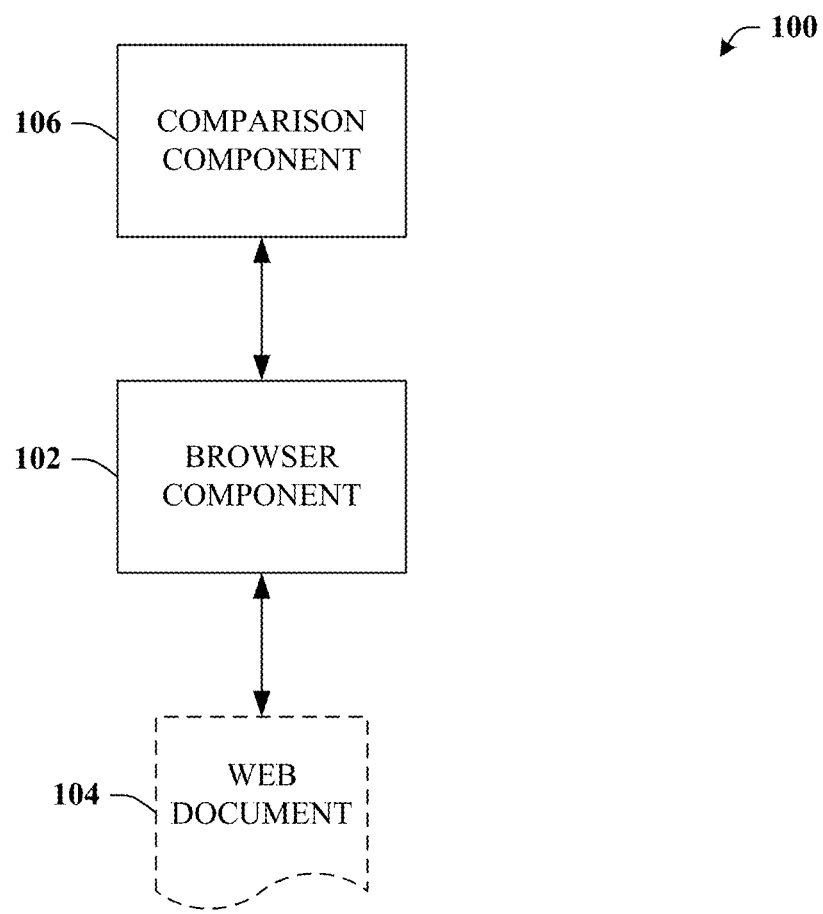
FIG. 1 is a block diagram of a computer-implemented system that can provide a non-invasive comparative shopping tool.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then the "X employs A or B" is satisfied under any of the foregoing instances.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As used herein, the words "purchase page" and "transaction page" can have particular meaning. In accordance with one or several of the aspects, a purchase page can be a web document/web page that has been identified as one that intends to sell a particular item, wherein the item is substantially any product or service. Oftentimes, the purchase page will have a purchase indicator such as a "buy" or "add to cart" button. Upon selecting this purchase indicator (e.g., clicking on it), a user will be redirected to a transaction page, where an item is added to a shopping cart and/or further information and/or confirmation of the purchase can be input.

In the present application, the words "non-invasive" or "non-invasively" when associated with a display or displayed information can mean any or all of the following: 1) that the display is relatively small in terms of available display space for an output device or for a web browser; 2) that the display is timely and/or relevant, e.g., it only appears when available data suggests that its presence would be welcome and/or useful; 3) the display is substantially likely to minimize annoyance, frustration, and/or dissatisfaction over conventional comparative shopping mechanisms; or 4) the display can be readily removed such as with a hotkey or "gesture". It is to be appreciated that these terms, non-invasive, non-invasively, as well as any or all of the foregoing terms can be augmented, modified, and/or supplemented by further definitions included infra.

Referring initially to FIG. 1, a computer-implemented system 100 that can provide a non-invasive comparative shopping tool is illustrated. Generally, the system 100 can include a browser component 102 that can be configured to receive information (e.g., source code) that relates to a web document 104 (e.g., a web page or the like). The browser component 102 can be, e.g., a commercially or publicly available web browser, as well as any proprietary application or utility. For example, the browser component 102 can be substantially any program used to view and/or interact with various types of Internet resources available on the World Wide Web (WWW).

Typically, the browser component 102 is a client-side component for a web server and can receive the source code (e.g., xml, html . . . ) residing at a particular Internet address (e.g., a Uniform Resource Locator (URL), a Uniform Resource Identifier (URI), a Relative Uniform Resource Locator (RELURL) . . . ). Generally, the source code can include instructions for displaying content of the web document 104 in browser component 102, as well as a variety of other information.

The system 100 can also include a comparison component 106 that can interface to the browser component 102. For example, the comparison component 106 can be a plug-in for the browser component 102 or a separate program (e.g., an applet, application, utility, tool . . . ) that runs on top of or in connection with the browser component 102. In addition, the comparison component 106 can be configured to identify and/or detect whether the web document 104 offers to sell an item (not shown), wherein the item can be substantially any product or service. For instance, the comparison component can identify whether the web document 104 is a purchase page. In particular, the comparison component 106 can, e.g., parse the source code of the web document 104 in order to facilitate this determination.

In accordance with one aspect of the claimed subject matter, the comparison component 106 can scan the source code for particular indicators. Among the most common indicators are buttons labeled "buy/purchase", "buy-it-now", "add to cart", etc., as well as hyperlinks with similarly labeled anchor text. However, it is to be appreciated that many other indicators can exist, any of which could potentially be employed by the comparison component 106 to make such a determination without departing from the scope or spirit of the claimed subject matter. In addition, many other ways can also exist to make the determination as to whether the present web document is a purchase page, such as an "add to cart" (or similar) button in connection with a URL that contains a product ID, or product number, or some variation thereof. Moreover, the comparison component 106 can operate in multiple stages, e.g., employ a relatively fast algorithm that can eliminate a large percentage of web documents (e.g., web document 104) in a first stage, and a deeper scan of the document at a second or later stage if the document passes the initial stage(s). It is, of course, impossible to detail all possible means by which the comparison component 106 can detect whether the web document 104 is a purchase page.

However, several example aspects are provided infra. In accordance with one aspect, the comparison component 106 can examine the entirety or a subset of the data available (e.g., source code, addresses, text/content, meta text/content, relationships between elements . . . ) and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The end result of the aforementioned inferences can be a Boolean variable populated with TRUE (e.g., "yes", the document is intended to sell an item and is therefore a purchase page) or FALSE (e.g., "no" the document is not a purchase page). While systems that attempt to identify whether a web page (e.g., web document 104) is a purchase page currently exist (e.g., web crawlers, spiders, bots and the like that farm information for data warehousing), these systems reside on the server side, and thus are not suitable to be of more direct and convenient use to an online shopper. In contrast, the comparison component 106 can reside on the client side, and can thus provide immediate utility to an online shopper precisely at those times in which the shopper can make particular use of the information supplied.

For example, one result of detecting that web document 104 is a purchase page is that doing so provides an excellent indicator that the user is interested in purchasing the item rather than simply surfing the web for general product information or other purposes. When the user is not interested in making a purchase, conventional (e.g., ad-based, recommendation-based) shopping comparison systems ultimately lead to confusion or annoyance for the user. Thus, by identifying to a degree of certainty and/or to a particular confidence level that the user is interested in shopping, this confusion and/or annoyance can be mitigated.

Although many means of making this identification/determination have been detailed supra, it is often important to an end-user that false positives are substantially minimized. For example, if a user is bombarded by advertisements when there is no interest in making a purchase, that user is often annoyed and/or frustrated. Thus, in accordance with one aspect, the determination can be made by detecting that a user clicked on one of the aforementioned indicators (e.g., an "add to cart" button or the like) and/or is directed or about to be directed to a (usually very standard and easily detectable) transaction page. Generally, at a transaction page, the page is secured (usually by employing Secure Socket Layer (SSL)) and the user must enter personal information such as credit card information, billing address, shipping address, etc. At the very least, the user is often asked to confirm the order, or the page updates a shopping cart with the item. In the case of any of the above means for identifying a transaction page, the comparison component 106 can be virtually certain that the web document 104 is a purchase page designed to sell an item as well as very certain that the user of the browser component 102 is interested in making a purchase.

Regardless of how it is detected (e.g., making inferences about web document 104 purchase indicators, receiving input suggesting a purchase indicator was accessed/clicked, detecting a purchase page, etc.), once a purchase page is detected, the comparison component 106 can be configured to determine various characteristics relating to the potential transaction. For example, the comparison component 106 can determine an item identifier and an item price, as detailed infra with reference to FIG. 2.

Figure 2:
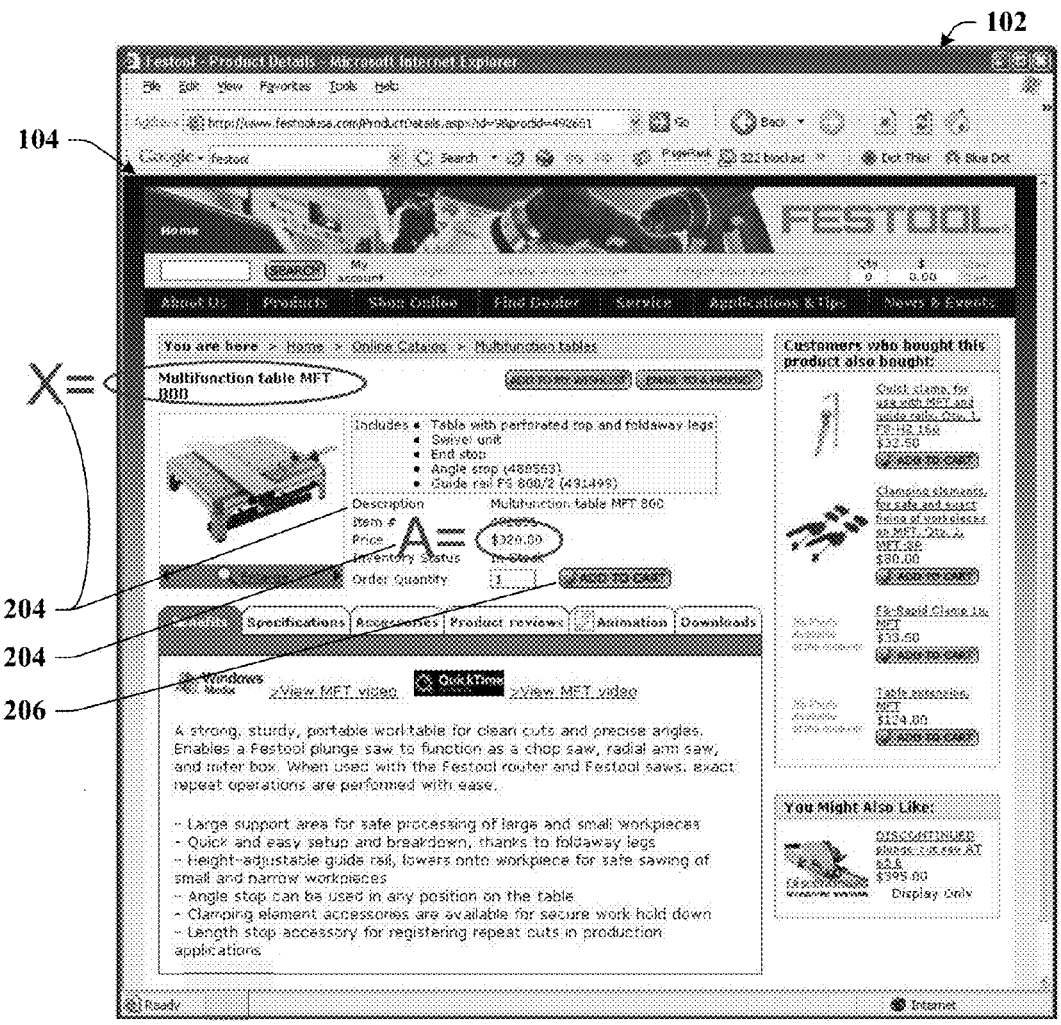
FIG. 2 is an exemplary computer-implemented browser component that displays an example purchase page.

While still referencing FIG. 1, but turning now to FIG. 2, an example browser component 102 that displays an example purchase page is illustrated. In general, web documents (e.g., web document 104) that intend to sell an item usually supply at least the item identifier or description 202 as well as the item price 204. Moreover, a purchase indicator 206 is generally supplied as well to signify that a transaction for the purchase of the item can be initiated by clicking or selecting the purchase indicator 206, which can provide a hyperlink to a transaction page. As detailed above, while the comparison component 106 can, e.g., parse source code for the web document 104 and employ various algorithms and the like to make inferences about whether the web document 104 is a purchase page, the comparison component 106 can also parse the source code to make inferences relating to the description 202 and the price 204.

For example, the description 202 (labeled as "X") will often appear on the web document 104 in bold font and/or designated as header text. In addition, the price 204 (labeled as "A") will usually be prefaced with a currency marker such as a "$" (as indicated here), "¢", "£", "¥", etc. It is to be appreciated that the comparison component 106 can convert between different currencies if necessary or desirable, e.g., by communicating with a remote component (not shown) to retrieve exchange rates. In accordance with one aspect, the comparison component 106 can determine the values for X and A (i.e., the description 202 and the price 204, respectively) based upon proximity to the purchase indicator 206. In addition or alternatively, the comparison component 106 can select text fields immediately following certain keywords such as "Description", "Price" and the like, or by employing various probabilistic algorithms and/or making inferences about the set of data available, as described supra. In accordance therewith, the comparison component 106 can extract X (description 202) and A (price 204), and transmit these data to a server, which is detailed more thoroughly in FIG. 3.

Figure 3:
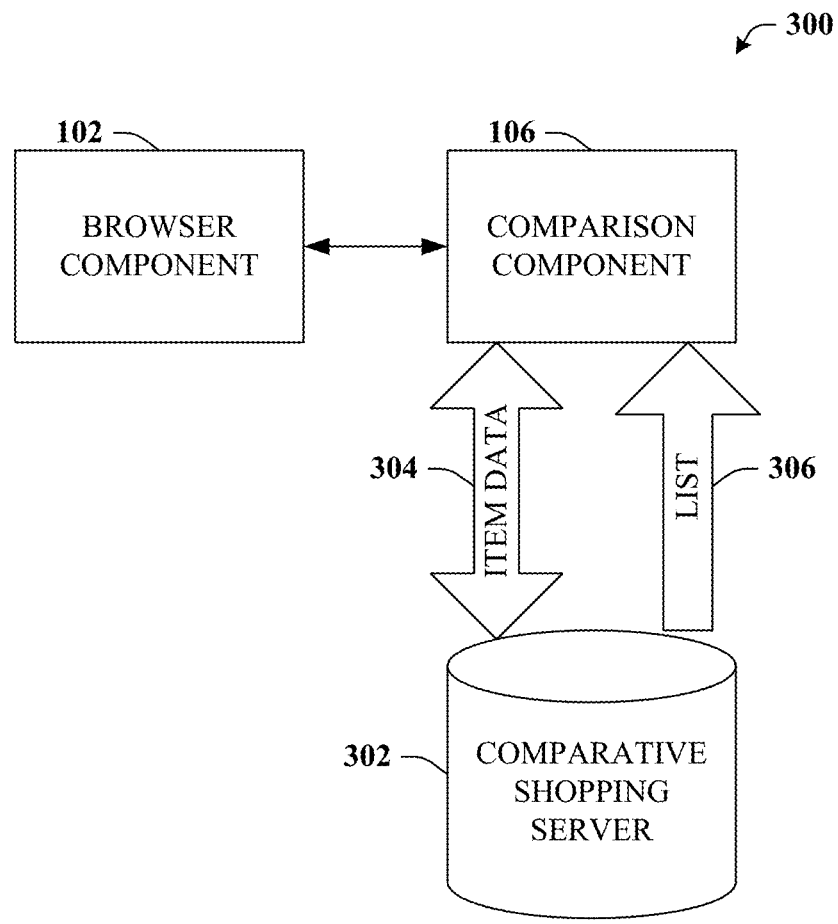
FIG. 3 illustrates an exemplary computer-implemented non-invasive comparative shopping system that can determine a description and/or a price for an item.

With reference now to FIG. 3 (while still referring to FIG. 2), a non-invasive comparative shopping system 300 that can determine a description 202 and/or a price 204 for an item is depicted. Broadly, the system 300 can include the browser component 102 that can be configured to receive information relating to a web document 104. The system 300 can also include the comparison component 106 that can determine to a degree of certainty that the web document 104 is intended to sell an item (e.g., the document 104 is a purchase page) and/or that a purchase of the item is desired (e.g., based upon a user navigating to this web document 104). In addition, the comparison component 106 can be configured to determine the description 202 and/or the price 204.

It is to be appreciated that the comparison component 106 can make either or both of these two determinations alone or in conjunction with a comparative shopping server 302. For example, depending upon the manner in which these determinations are resolved, the comparison component 106 can be configured to transmit information to and receive information from the comparative shopping server 302 such as, e.g., when the web document 104 includes several prices and the comparison component 106 must retain assistance to determine the proper value for A (price 204).

In addition, once the comparison component 106 has determined (with or without the aid of the comparative shopping server 302) the description 202 and the price 204, these values as well as other data such as the Internet address associated with the web document 104, etc. can be transmitted to the comparative shopping server 302, as indicated by the transfer of item data 304. Upon receipt of the item data 304, the comparative shopping server 302 can compare these values with stored data. For example, the comparative shopping server 302 can compare the price 204 with items that fit the description 202 (e.g., items that are the same or substantially similar) available at other shopping websites, brick-and-mortar stores that sell and/or advertise online, and the like. The comparative shopping server 302 can also create new records or update stored data relating to the present transaction including, but not limited to, any or all of the following: the price, the description, availability, the Internet address, etc.

The comparative shopping server 302 can also take additional actions to enhance integrity and/or efficiency. For example, in some cases the advertised price 204 may not be the actual price the user is charged. For instance, the advertised price 204 may require an additional purchase, filing out a survey, or even be outright fraud, etc. Accordingly, the comparative shopping server 302 can, e.g., follow the links provided by the purchase indicator 206 (e.g., from a purchase page to a transaction page) to verify that the listed price 204 matches what a purchaser would in fact be charged. The comparative shopping server 302 can be configured to automatically set up an account (e.g., if required to access the bottom line), configured to watch for usually large surcharges and/or shipping and handling fees, as well as a variety of other useful detection means to verify that the price 204 is legitimate. If the comparative shopping server 302 determines that the price 204 is not germane, then data store records/listings for this item, the seller, the Internet address, etc. can be flagged appropriately and even removed from the system.

The comparative shopping server 302 can also be configured to transmit a list 306 to the comparison component 106. The list 306 can be, e.g., a set of N (e.g., 10) "best" comparative items similar to the item intended to be sold on the web document 104, where N is a positive integer configurable either on the server side (e.g., a default value adjustable based upon empirical data) or the client side (e.g., a configurable preference set by way of the comparison component 106). The N best comparative items can be chosen based upon pricing alone (e.g., the N lowest priced items) as well as based upon added features in connection with an excellent comparative price. In addition, the list 306 can include an Internet address (e.g., a URL, etc. to a web document 104 advertising the item) for each of the N comparative items.

Figure 4:
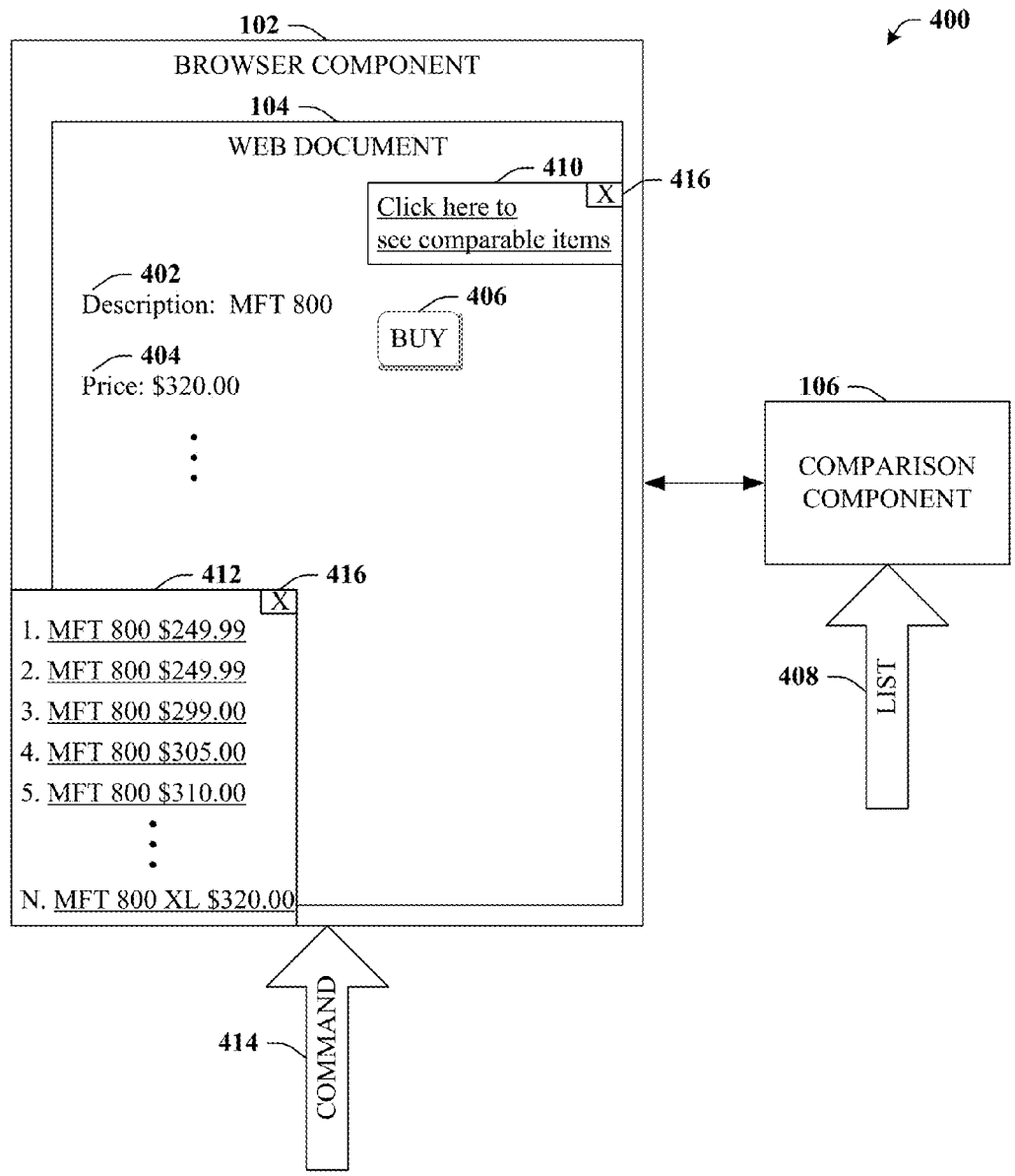
FIG. 4 illustrates a system that can display non-invasive comparative shopping information.

Turning now to FIG. 4, a system 400 that can display non-invasive comparative shopping information is illustrated. In general, the system 400 can include the browser component 102 operable to display the web document 104, and the comparison component 106 that can identify a purchase page. For example, the comparison component 106 can identify the description 402, the price 404 and the purchasing indicator 406. As detailed supra, the comparison component 106 can employ various algorithms and inferences to make this determination. Moreover, based upon the fact that the browser component 102 has been directed to this particular web document 104, the comparison component 106 can infer that, e.g., a user of the browser component 102 intends to purchase the item indicated by description 402.

It should be readily understood that at this point there can be a degree of certainty that a shopper will welcome further information about the item indicated by description 402. In conventional ad-based or recommendation-based systems, online shoppers are often confused and annoyed by prolific and constant advertisements regardless of their actual intentions. In contrast, the claimed subject matter can provide additional information to a shopper at convenient times and in a manner that is non-invasive. For example, as described with reference to FIG. 3, the comparison component 106 can communicate with a comparative shopping server (not shown), and retrieve a list 408 of comparable items.

In accordance with one aspect, the comparison component 106 can optionally generate a relatively small notification 410 that can, e.g., indicate comparable items are available for purchase at favorable prices. Should this notification 410 be clicked, the list 408 can be presented as indicated by display 412 or in another appropriate manner. In accordance with another aspect, the notification 410 need not be first created. Rather, the display 412 that includes the list 408 of 1 to N comparable items can be automatically generated and displayed. However, in accordance with one aspect of the claimed subject matter, the comparative shopping displays (e.g., notification 410, display 412, etc.) are configured to be as non-invasive as is feasible. Thus, these displays (410, 412) can be readily removed, minimized, moved to the back, and/or disposed of by receiving a command 414. The command 414 can be received from an input device such as a mouse, keyboard, touch display, light pen, etc. such as a "click" on element(s) 416. In addition, the comparison component 106 can be configured to close or minimize the displays 410, 412 based upon a "gesture" from the input device. For example, a predefined gesture (e.g., moving a mouse from side-to-side relatively rapidly or another gesture) can be received as command 414 indicating to the comparison component 106 that the displays should be closed, minimized, moved to the back of the desktop, or the like.

It is to be appreciated that the displays 410, 412 can be embedded in the web document 104 or be configured as a pop-up window, an overlay, a tab, a frame, or other appropriate displaying style. In addition, the displays 410, 412 can be resized, moved, and/or reoriented conveniently. As indicated, the display 412 can include 1 to N comparable items, usually at more advantageous prices and/or with additional features. For example, comparable items 1-5 all have a lower price than the price 404 indicated by the web document 104. Comparable item N appears at the same price, but has or is likely to have additional features given it is in reference to the MFT 800 XL model rather than the base MFT 800 model.

In addition, each comparable item 1-N can be anchor text for a hyperlink (as indicated by the underlined text) to a corresponding Internet address where the respective comparable item can be found for sale at the listed comparable price. Accordingly, when presented with the display 412, e.g., a user can more easily navigate to any of the N comparable items with a single click. Thus, N clicks can effectively yield N different comparable items, potentially reducing the tedium of online shopping. Moreover, each of the comparable items are substantially likely to represent one of the N best deals available online rather than an arbitrary offer returned, for instance, by a search engine based upon the description 402 keywords and/or from a seller that paid advertising fees to the search engine to be listed for those keywords even though that particular advertiser may not offer competitive prices.

Figure 5:
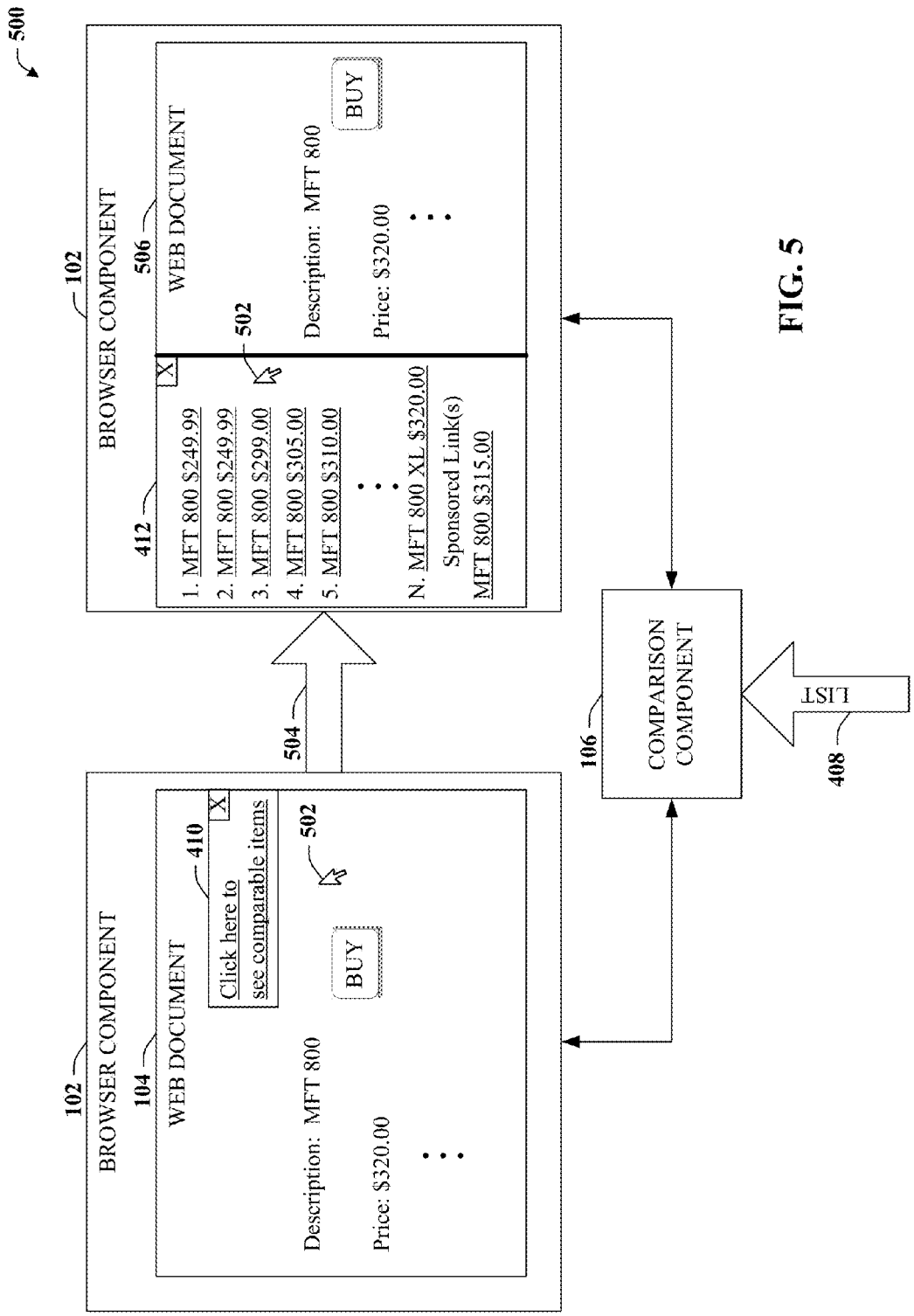
FIG. 5 depicts a block diagram of an exemplary computer-implemented system that can employ frames in order to provide a comparative shopping tool.

FIG. 5 illustrates an exemplary system 500 that can employ frames to provide a comparative shopping tool. Depicted are the browser component 102 and the web document 104. As described previously, the comparison component 106 can receive the list 408 of comparable items and generate a pop-up (or similar) notification 410. If the comparison component 106 receives an input (e.g., from an input device represented by cursor 502) indicating a click on the notification 410, then the browser component 102 can transition 504 to a different configuration wherein the list 408 can be provided in a display 412. As detailed in connection with FIG. 4, the display 412 can be an overlay, frame, or any other appropriate mechanism that can, e.g., provide convenience as well as remain relatively non-invasive.

Display 412 is shown here as a side panel frame with the web document 104 reformatted for new document dimensions as web document 506. It is to be appreciated that the notification 410 can be optional and in some aspects of the claimed subject matter, display 412 can be presented automatically. In accordance with one aspect, an input signaling a click (e.g., by way of cursor 502) on one of the comparative items can alter the contents of the web document 506. For example, clicking on item "1. MFT 800 $249.99" can redirect the browser component 102 to the Internet address associated with that item, and populate the main body frame (e.g., web document 506) with content from that address. Likewise, a click on item "2." can replace the content of document 506 with that particular vendor's web page, and in each instance, the side panel frame can be maintained for easy navigation.

In accordance with one aspect, a click on notification 410 can affect a transition 504 in which the display 412 represent the entire view (not shown) of the content display portion of the browser component 102. While the display 412 is typically as non-invasive as is feasible, this aspect, because it has access to more screen real estate, can provide additional information for each comparative item, such as the vendor's name, location, rating, more information about the item, etc. According to such an aspect (as well as others), a click on one of the comparative items can be configured to create a new instance of browser component 102 (not shown), with a destination of the associated Internet address, while the first instance of browser component 102 is maintained for subsequent convenient navigation among the comparative items.

While for many purposes the display 412 includes comparable items for (and hyperlinks to) the N "best" comparable items available, some of these comparable items can be chosen based upon criteria other than price. For example, a vendor's reputation, warranties, manufacturer, and the like.

As previously described, conventional systems often bombard the user with advertisements, which can lead to dissatisfaction on the part of the end user (e.g., an online shopper). For example, a consumer may be presented with items that are not competitive based on price, quality, etc. simply because that particular seller/vendor pays a small advertising fee to the comparison/recommendation system. Oftentimes, such a situation is directly contentious to the consumer's goals. However, in some situation, such as when presented more properly, advertisements can be helpful and welcomed by the consumer. In accordance therewith, the display 412 can also be configure to display appropriate ads, as shown here under the heading "Sponsored Link(s)".

Figure 6:
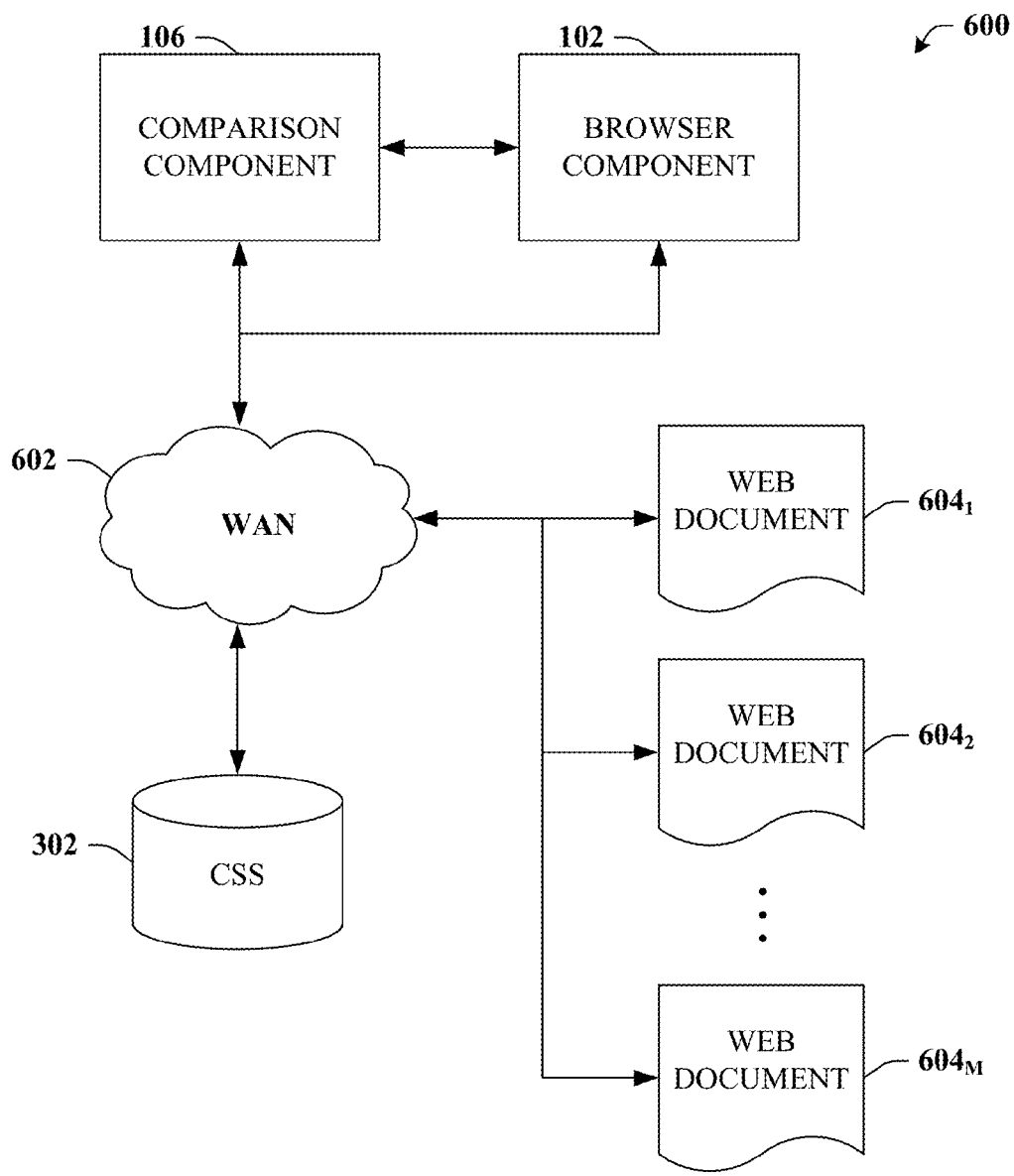
FIG. 6 illustrates a block diagram of a computer-implemented system that can more conveniently and less invasively provide comparative shopping information.

With reference now to FIG. 6, a system 600 that can more conveniently and less invasively provide comparative shopping information is depicted. Generally, the system 600 can include the browser component 102 operatively coupled to the comparison component 106. In one aspect the comparison component 106 can be a plug-in for the browser component 102. In either situation, both the comparison component 106 and the browser component 102 can be interfaced to a Wide Area Network (WAN) 602, which can be, e.g., the Internet, WWW, a mobile phone network and the like. The comparison component 106 can interface the comparative shopping server 302 as well as web documents $604_1$-$604_M$ by way of the WAN 302. Web documents $604_1$-$604_M$ can be referred to herein either collectively or individually as web documents 604 even though each of the web documents 604 respectively can have distinguishing features.

Typically, a subset of the web documents 604 are purchase pages and thus can relate to an item (e.g., product or service) available for purchase by way of the WAN 602. The comparative shopping server 302 can maintain a data store of information relating to these items (e.g., description/identifier, price, Internet address . . . ). When the browser component 102 receives information (e.g., source code) relating to one of the web documents 604, then the comparison component 106 can determine whether the web document 604 is a purchase page. If the resulting determination is "yes" or TRUE, then the comparison component 106 can identify, extract, and/or transmit various data (e.g., item identifier/description, price . . . ) to the comparative shopping server 302. It is to be appreciated that if the comparison component 106 cannot make the initial determination or cannot identify the necessary data, the comparative shopping server 302 can be employed to aid in either of these determinations.

The comparative shopping server 302 can respond to the comparison component 106 with a list of web documents 604 that offer the same or substantially similar items for sale. Typically, the list can include comparative items that are more advantageous to the shopper such as the lowest priced items, highest quality, most reliable, etc. The comparison component 106 can display a subset of the contents of this list in a non-invasive manner. The comparative shopping server 302 can also verify the legitimacy of any of the items offered by way of the web documents 604, however, even if, for whatever reason, one or some of the links provided are not satisfactory, the comparative items displayed are substantially among the best that can be located online.

Accordingly, the tedious and time consuming tasks common to Internet shopping can be mitigated by the comparison component 106 (and/or the comparative shopping server 302), which can short-circuit most of the "legwork" in advance. For example, conventional searches for items (e.g., by way of a search engine) can provide hundreds if not thousands of results, each to a varying degree of relevance. Many of those resulting links will not be to purchase pages, but rather to other content that merely includes the text of the item sought to be purchased, but no indication that it can actually be purchased. Thus, several additional acts or clicks are required to get to a purchase page or the user might be forced to return to the results page and try a different link.

Moreover, even after a resulting purchase page web document 604 is discovered, it is no more likely to offer the "best" (e.g., cheapest) item than any of the other web documents 604. In contrast, the claimed subject matter can provide direct hyperlinks to purchase pages of substantially any item, and each of the hyperlinks can be more likely to represent the most competitive vendor that the user could find, even after long hours of searching. In essence, in accordance with certain aspects of the claimed subject matter, all this additional effort, which has traditionally been borne by the user/online shopper, can be delegated instead to the described components (e.g., 106, 302, etc.). These components can perform such tasks automatically and do so more effectively than can the average online shopper. Moreover, the single-click comparative results can be provided to the online shopper non-invasively and virtually instantaneously.

Figure 7:
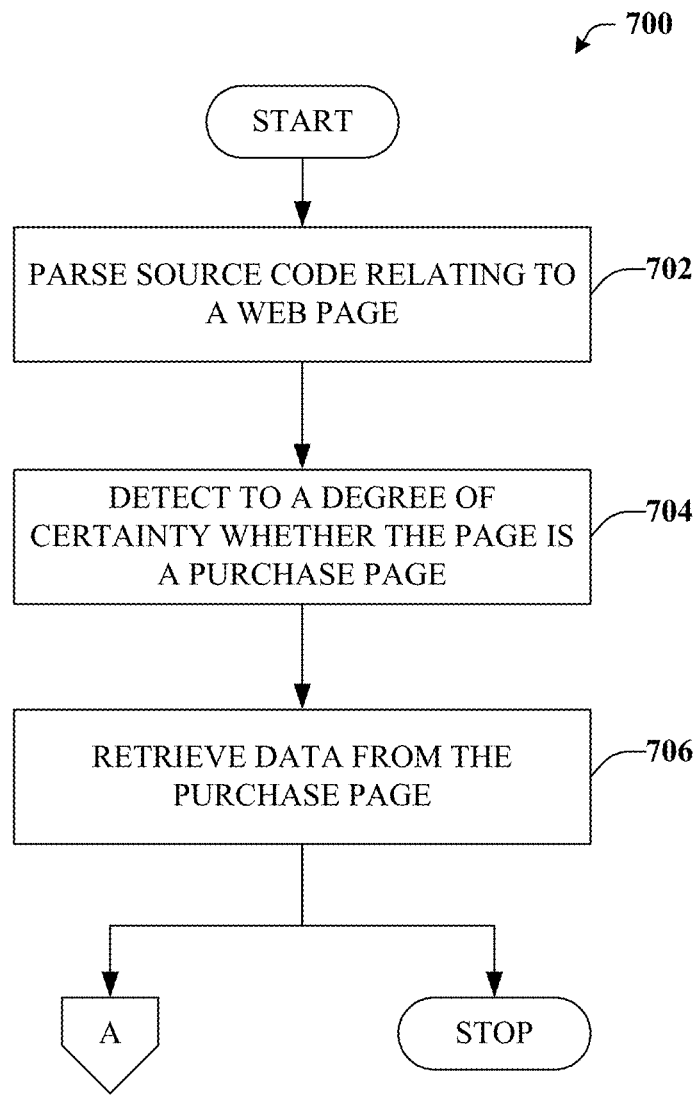
FIG. 7 is an exemplary flow chart of procedures for extracting relevant comparison shopping data.
Figure 8:
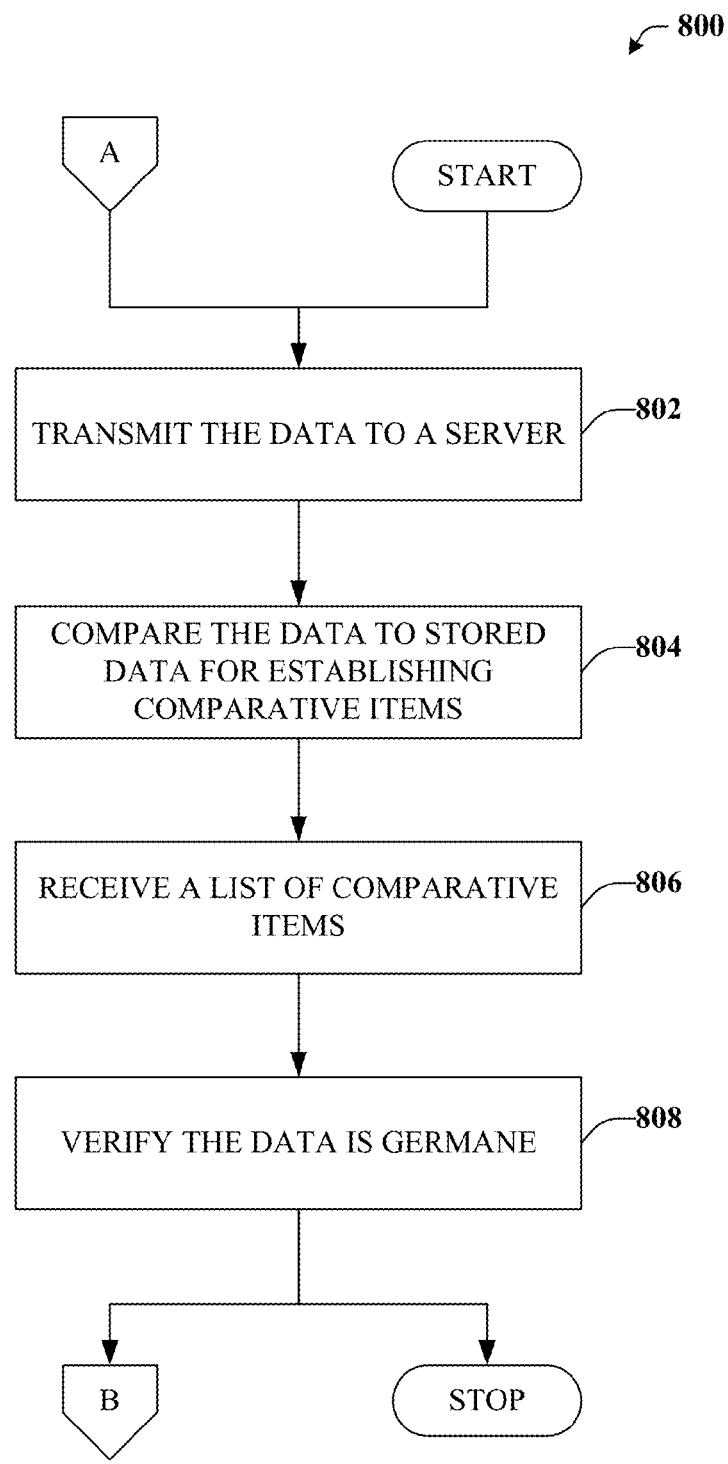
FIG. 8 depicts an exemplary flow chart of procedures for facilitating comparison shopping.
Figure 9:
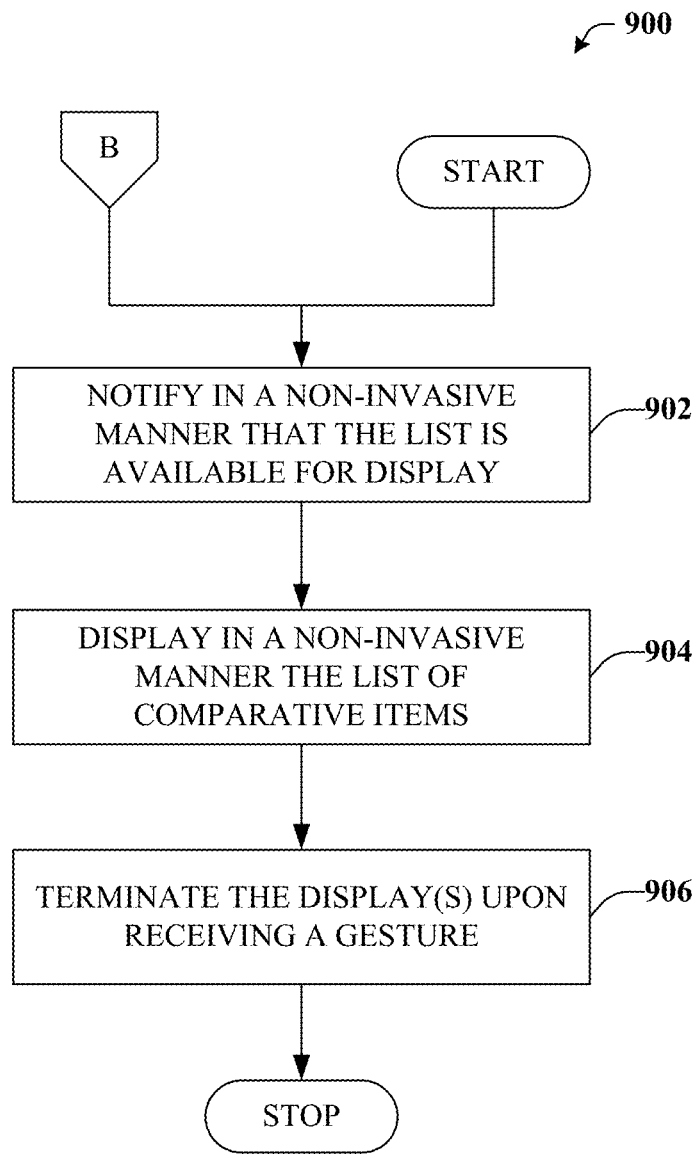
FIG. 9 illustrates an exemplary flow chart of procedures for facilitating comparison shopping in a non-invasive way.

FIGS. 7, 8, and 9 illustrate process flow diagrams of computer-implemented methods. While, for purposes of simplicity of explanation, the one or more methods shown herein, e.g., in the form of a flow chart, are shown and described as a series of acts, it is to be understood and appreciated that the subject invention is not limited by the order of acts, as some acts may, in accordance with the claimed subject matter, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Referring now to FIG. 7, an exemplary flow chart of procedures defining a method 700 for extracting relevant comparison shopping data is illustrated. Generally, at 702, source code (e.g., xml, html . . . ) relating to a web page/web document can be parsed, and at 704, a purchase page can be detected to a degree of certainty. The degree of certainty can be based upon, for example, mechanisms such as algorithms, inferences, and/or confidence ratings (described in more detail supra, in connection with FIG. 1). Typically, if any of these mechanisms determines to the requisite degree of certainty that the web page is a purchase page, then, e.g., a Boolean variable can be set to TRUE.

Common purchase indicators such as buttons, hyperlinks, and the like with appropriate anchor text such as "add to cart" "purchase item", etc. are often excellent indicators that the web page is a purchase page. In accordance with one aspect of the claimed subject matter, the act 704 can detect that the web page is a transaction page (e.g., a web document directed to upon application and/or clicking of a purchase indicator) in order to achieve the requisite degree of certainty. For example, while a purchase page is a likely indicator that a purchase of the underlying item is desired, clicking through to a transaction page is potentially an even stronger indicator yet.

At 706, various data from the purchase page (or according to some aspects the transaction page) can be retrieved for facilitating comparison shopping. For example, the data can include an item description or identifier, an item price, as well as an associated URL. Once more various algorithms and/or inferences can be employed to earmark this data for retrieval. For example, the identifier is often in bold and/or header text while the price is often prefaced by a currency symbol. Moreover, both elements of data are often located in close proximity to a purchase indicator.

Turning now to FIG. 8, an exemplary flow chart of procedures defining a method 800 for facilitating comparison shopping is depicted. In general, at 802, data (e.g., page data such as an identifier, a price, a URL, etc.) can be transmitted to a server, such as a comparison shopping server described in more detail with reference to FIGS. 3 and 6. Typically, the data is transmitted by way of a WAN such as the Internet, WWW, a cellular phone network, or the like. At 804, the data can be compared to stored data for establishing comparative items. For example, results from other purchase pages (e.g., those coupled to or accessible by the WAN) can be stored with associated comparative item descriptions and comparative prices. All or a subset of the purchase pages can be ranked and/or ordered for the associated comparative item by virtue of best price, quality, features, or a variety of other factors.

At 806, a list of comparative items can be received. The list can include, e.g., the first N ranked/ordered comparative items as well as the corresponding URL to that particular other purchase page. In accordance with one aspect of the claimed subject matter, the list can also include comparative items based upon advertisements, such as sponsored link(s). At 808, the data from the purchase page (and/or data from one of the other purchase pages) can be verified to be legitimate and/or germane. For example, the hyperlink associated with a purchase indicator can be traversed to ensure that the indicated item price is the actual price charged.

Turning now to FIG. 9, an exemplary flow chart of procedures defining a method 900 for facilitating comparison shopping in a non-invasive way is illustrated. Generally, at 902, a non-invasive notification can be provided for indicating that a list of comparable items is available for display. In accordance with one aspect, the act 902 is optional and the notification need not be displayed. At 904, the list of comparable items can be displayed in a non-invasive manner. For example, the non-invasive display can occur immediately upon a determination that a purchase page (or transaction page) has been detected, such as described in connection with act 702 from FIG. 7, or upon clicking upon the notification detailed at act 902. The list and/or display can be a pop-up overlay configurable to be always on top, populate a frame, a tab, or some other mechanism. It is to be appreciated that the list can provide hyperlinks to other purchase pages such as those other purchase pages that offer an item substantially similar to the described item, but at a better price, with more features, etc.

At 906, the displayed list of comparable items and/or the notification can be terminated, minimized, moved behind other windows, etc. Various commands can be implemented in order to effectuate the act 906. For example, the command can come in the form of input from an input device (e.g., a mouse or keyboard). The command can be a hotkey, a mouse click (e.g., on a "minimize" or "close" icon), as well as a gesture, such as a particular shape or motion from an input device.

Figure 10:
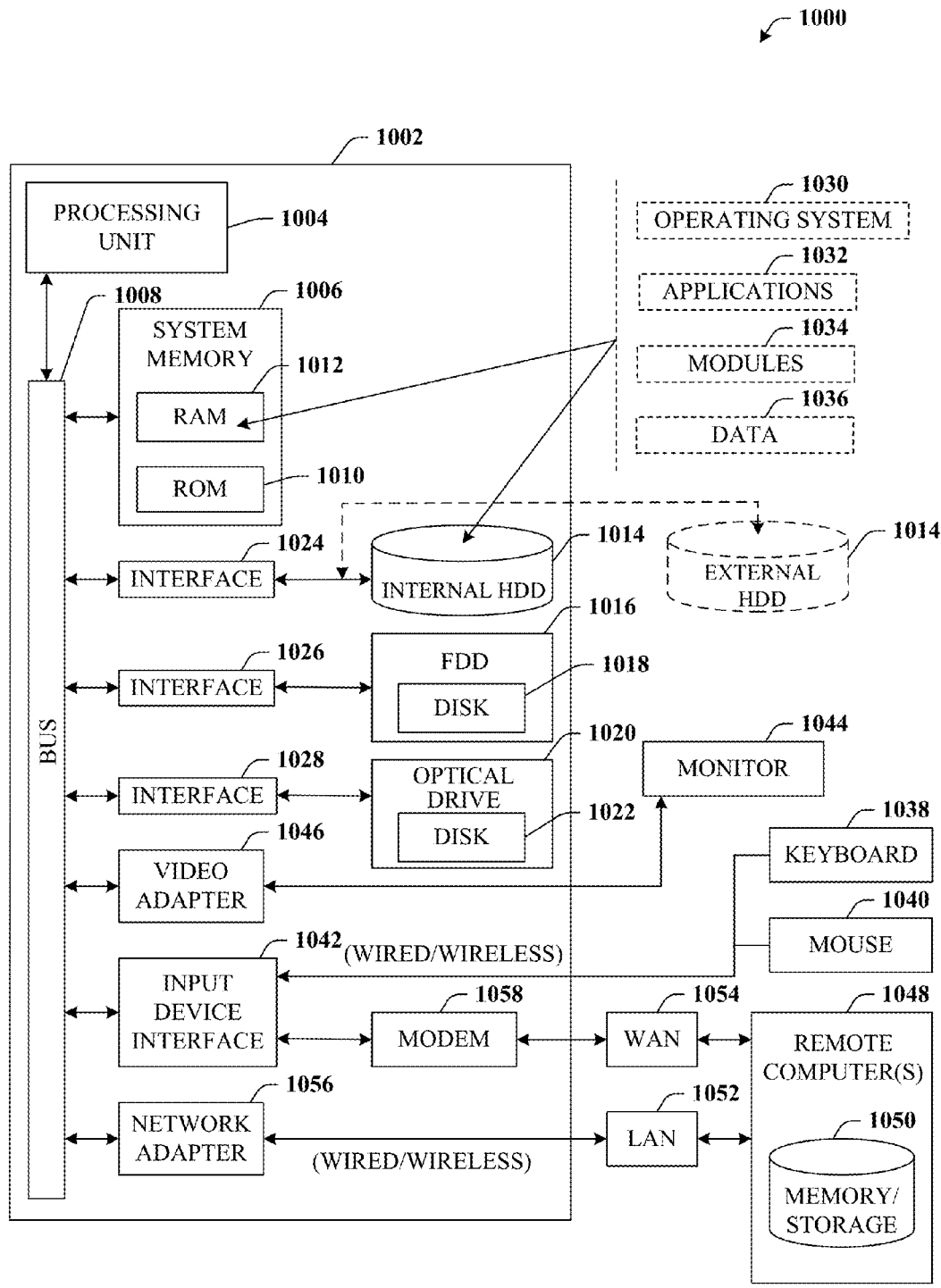
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. For example, various components of the systems and/or aspects thereof described supra can be implemented by way of the system 1000. Additionally, while the claimed subject matter has been described above in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1094 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
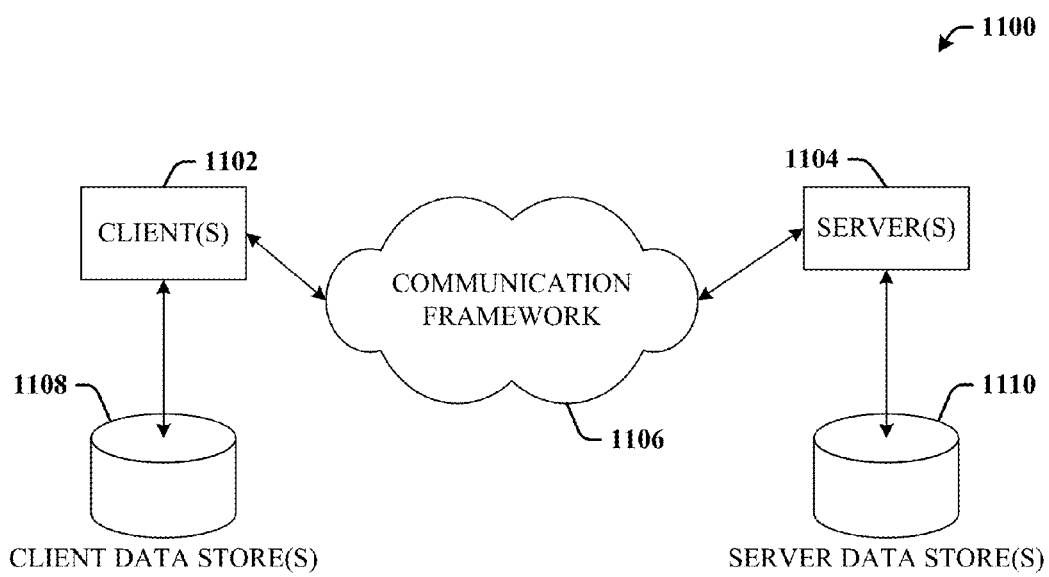
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware such as a digital camera with computer interface support and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the terms "includes" or "include" are used in either the detailed description or the claims, such terms are intended to be inclusive in a manner similar to the term "comprising" as "comprising" is interpreted when employed as a transitional word in a claim.

What is claimed is:

1. A computer-implemented method comprising:
    under control of one or more processors of a computing device executing computer-executable instructions stored in memory of the computing device:
        determining, in response to receiving information associated with a web page, that the web page is a purchase page rather than a different type of web page, the determining being performed by:
            examining content of the web page to identify text associated with one or more buttons or hyperlinks of the web page;
            determining, based on the text associated with the one or more buttons or hyperlinks, whether the web page is the purchase page;
        receiving a user selection input to the computing device;
        detecting a click-through of the one or more buttons or hyperlinks of the web page based on the user selection input to the computing device; and
        based at least in part on detecting the click-through, determining that a requisite degree of certainty has been achieved for determining that the web page is the purchase page, wherein the purchase page includes an item that is a product or service;
        based at least in part on determining that the requisite degree of certainty has been achieved, retrieving data from the purchase page, the data comprising at least one of an identifier of the item or a price of the item;
        transmitting, via a communications interface of the computing device, the data to a comparative shopping server;
        receiving, from the comparative shopping server via the communications interface, additional information associated with items that are comparable to the item based at least in part on the data; and
        causing presentation, on a display of the computing device, of the additional information.

2. The computer-implemented method of claim 1, wherein:
    the additional information comprises a list of the items that are comparable to the item, each at a comparative price to the price of the item and being offered for sale at a different purchase page respectively.

3. The computer-implemented method of claim 1, wherein the comparative shopping server determines a legitimacy of the price of the item.

4. The computer-implemented method of claim 2, wherein the list comprises a hyperlink for each item in the list, and each hyperlink corresponds to a comparative web document that is configured to advertise or offer a corresponding item for sale.

5. The computer-implemented method of claim 1, wherein at least one item of the items that are comparable to the item is identical to or substantially similar to the item.

6. The computer-implemented method of claim 1, further comprising determining that a second web page that is directed to upon the click-through of the one or more buttons or hyperlinks of the web page is a transaction page, wherein determining that the requisite degree of certainty has been achieved is further based on determining that the second web page is the transaction page.

7. The computer-implemented method of claim 6, further comprising, based at least in part on detecting the click-through, identifying the second web page as a transaction page by at least one of:
    detecting that the second web page is secured by employing a Secure Sockets Layer (SSL); or
    identifying one or more fields on the second web page are for entering personal information.

8. The computer-implemented method of claim 1, wherein the click-through comprises a command received through an input device of the computing device, and wherein the input device comprises one or more of a mouse, keyboard, touch display, or light pen.

9. One or more computer storage devices having stored thereon computer-executable instructions that, when executed by a processor, cause one or more computers to perform operations comprising:
    determining, in response to receiving information associated with a web document, that the web document is a purchase page rather than a different type of web page, the determining being performed by:
- examining content of the web document to identify text associated with one or more buttons or hyperlinks of the web document;
- determining, based on the text associated with the one or more buttons or hyperlinks, whether the web document is the purchase page;
- receiving a user selection input to the one or more computers;
- detecting a click-through of the one or more buttons or hyperlinks of the web document based on the user selection input to the one or more computers; and
- based at least in part on detecting the click-through, determining that a particular confidence level has been achieved for determining that the web document is the purchase page, wherein the purchase page includes an item that is a product or service;

based at least in part on determining that the particular confidence level has been achieved, extracting page data from the purchase page, the page data comprising at least one of an identifier of the item or a price of the item;

transmitting, via a communications interface of the one or more computers, the page data to a comparative shopping server;

receiving, from the comparative shopping server via the communications interface, additional information associated with items that are comparable to the item based at least in part on the page data; and causing presentation, on a display of the one or more computers, of the additional information.

10. The one or more computer storage devices of claim 9, wherein the operations further comprise determining whether the page data is legitimate.

11. The one or more computer storage devices of claim 9, wherein:
the additional information comprises a list of the items that are comparable to the item, each at a comparative price to the price of the item and being offered for sale at a different purchase page respectively.

12. The one or more computer storage devices of claim 11, wherein the list comprises a hyperlink for each item in the list, each hyperlink corresponds to a comparative web document that is configured to advertise or offer a corresponding item for sale.

13. The one or more computing storage devices of claim 11, wherein the list includes a ranking of the items that are comparable to the item, the ranking based on one or more criteria associated with the items in the list.

14. The one or more computing storage devices of claim 13, wherein the one or more criteria include one or more of price, quality, or features of the items in the list.

15. The one or more computer storage devices of claim 9, wherein at least one item of the items that are comparable to the item is identical to or substantially similar to the item.

16. A system comprising:
- one or more processors;
- a display;
- a communications interface;
- an input device; and
- memory storing computer-executable instructions which, when operated by the one or more processors, cause the system to perform operations including:
  - determining, in response to receiving information associated with a web page, that the web page is a purchase page rather than a different type of web page, the determining being performed by:
    - parsing content of the web page to identify text associated with one or more buttons or hyperlinks of the web page;
    - determining, based on the text associated with the one or more buttons or hyperlinks, whether the web page is the purchase page;
    - receiving a user selection input via the input device;
    - detecting a click-through of the one or more buttons or hyperlinks of the web page based on the user selection input received via the input device; and
    - based at least in part on detecting the click-through, determining that a requisite degree of certainty has been achieved for determining that the web page is the purchase page, wherein the purchase page includes an item that is a product or service;
  - based at least in part on determining that the requisite degree of certainty has been achieved, retrieving data from the purchase page, the data comprising at least one of an identifier of the item or a price of the item;
  - transmitting, via the communications interface, the data to a comparative shopping server;
  - receiving, from the comparative shopping server via the communications interface, additional information associated with items that are comparable to the item based at least in part on the data; and
  - causing presentation, on the display, of the additional information.

17. The system of claim 16, wherein:
the additional information comprises a list of the items that are comparable to the item, each at a comparative price to the price of the item and being offered for sale at a different purchase page respectively.

18. The system of claim 16, wherein at least one item of the items that are comparable to the item is identical to or substantially similar to the item.

* * * * *